US012811240B2

(12) United States Patent
Schüssler et al.

(10) Patent No.: US 12,811,240 B2
(45) Date of Patent: *Nov. 24, 2026

(54) DEGASSING CHANNEL, BATTERY, AND MOTOR VEHICLE

(71) Applicant: AUDI AG, Ingolstadt (DE)

(72) Inventors: Martin Schüssler, Kösching (DE); Markus Thurmeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 957 days.

This patent is subject to a terminal disclaimer.

(21) Appl. No.: 17/566,314

(22) Filed: Dec. 30, 2021

(65) Prior Publication Data

US 2022/0271390 A1 Aug. 25, 2022

(30) Foreign Application Priority Data

Feb. 23, 2021 (DE) ............................ 102021104277

(51) Int. Cl.

*H01M 50/358* (2021.01)
*H01M 10/0525* (2010.01)
*H01M 50/249* (2021.01)

(52) U.S. Cl.

CPC ..... *H01M 50/358* (2021.01); *H01M 10/0525* (2013.01); *H01M 50/249* (2021.01); *H01M 2220/20* (2013.01)

(58) Field of Classification Search

CPC ........... H01M 50/358; H01M 10/0525; H01M 50/249; H01M 2220/20; H01M 50/209; H01M 50/204; H01M 50/3425; H01M 50/394

See application file for complete search history.

(56) References Cited

U.S. PATENT DOCUMENTS

2017/0149047 A1 5/2017 Guen

FOREIGN PATENT DOCUMENTS

| | | | | | |
|---|---|---|---|---|---|
| CN | 1007548 | B | * | 4/1990 | ............... H01G 9/12 |
| CN | 105027323 | A | | 11/2015 | |
| CN | 105280861 | A | | 1/2016 | |
| CN | 110088933 | A | * | 8/2019 | .......... H01M 50/333 |
| CN | 110165104 | A | * | 8/2019 | .......... H01M 10/613 |
| CN | 111969134 | A | | 11/2020 | |

(Continued)

OTHER PUBLICATIONS

CN110088933A (Machine Translation) (Year: 2019).*

(Continued)

*Primary Examiner* — Nicole M. Buie-Hatcher
*Assistant Examiner* — Kenneth Max Otero
(74) *Attorney, Agent, or Firm* — Maier & Maier, PLLC

(57) ABSTRACT

A degassing channel for a battery of a motor vehicle designed for arrangement on a battery module of the battery, which battery module includes the at least one battery cell with an at least releasable degassing opening. The degassing channel has an opening region through which, in the event that the degassing channel is arranged on the battery module, gas escaping from the degassing opening can at least be introduced somewhat into an interior of the degassing channel. In this case, the opening region has a shielding element which is designed to at least largely prevent a gas flowing through the degassing channel via the opening region from escaping from the degassing channel through the opening region.

3 Claims, 4 Drawing Sheets

(56) References Cited

FOREIGN PATENT DOCUMENTS

| | | | | |
|---|---|---|---|---|
| CN | 112005397 | A | 11/2020 | |
| DE | 102011079037 | A1 | 1/2013 | |
| DE | 102012217630 | A1 | 3/2014 | |
| DE | 102012219379 | A1 * | 4/2014 | .......... H01M 50/317 |
| DE | 102013201365 | A1 * | 7/2014 | .......... H01M 50/308 |
| DE | 102013204087 | A1 | 9/2014 | |
| DE | 102013216071 | A1 | 2/2015 | |
| EP | 3618148 | A1 | 3/2020 | |

OTHER PUBLICATIONS

DE 102013201365 A1 (Machine Translation) (Year: 2014).*
DE 102013201355 A1 (Machine Translation) (Year: 2025).*
CN110088933A_Machine_Translation_(Year: 2025).*
CN_110165104_A_Machine_Translation_.pdf (Year: 2025).*
DE_102012219379_A1_Machine_Translation_.pdf (Year: 2025).*
DE102013201365A1_Machine_Translation_.pdf (Year: 2025).*
CN_1007548_B_-_Machine_Translation.pdf (Year: 2025).*
CN_1007548_B_-_Machine_Translation (Year: 2025).*
CN_110165104_A_Machine_Translation (Year: 2025).*
CN110088933A_Machine_Translation_.pdf (Year: 2025).*
DE_102012219379_A1_Machine_Translation (Year: 2025).*
DE102013201365A1_Machine_Translation (Year: 2025).*
Office Action issued on Dec. 29, 2023, in corresponding Chinese Application No. 202210184371.4, 13 pages.
German Search Report issued on Jul. 6, 2021 in corresponding German Application No. 102021104277.1; 18 pages; Machine translation attached.

* cited by examiner

DEGASSING CHANNEL, BATTERY, AND MOTOR VEHICLE

FIELD

The invention relates to a degassing channel for a battery, in particular a high-voltage battery, of a motor vehicle, the degassing channel being designed for arrangement on a battery module of the battery, which battery module comprises at least one battery cell with an at least releasable degassing opening. The degassing channel has an opening region through which, in the event that the degassing channel is arranged on the battery module, gas escaping from the degassing opening can be at least partially introduced into an interior of the degassing channel. The invention also includes a battery with such a degassing channel as well as a motor vehicle.

BACKGROUND

High-voltage batteries, which are used as traction batteries for electric or hybrid vehicles, typically have several battery modules, each with several battery cells. In the event of an accident or a short-circuit in such a cell, there is a risk of thermal runaway, that is, thermal runaway of such a battery cell. This typically creates hot gases that escape from the battery cells. In order to facilitate the escape of such gases from the battery cells, battery cells typically have releasable degassing openings in the form of, for example, bursting membranes. In the event of excess pressure inside the cell, these rupture and thus release the gas to escape. Such a hot gas escaping from the cells should, if possible, be diverted as quickly as possible from the surrounding cells in order, for example, to prevent thermal runaway caused by such a hot gas in cells that are still intact. In addition, the aim is to prevent the heat generated when passing through the cell, and in particular also a fire, from spreading into the interior of the motor vehicle, or this spreading should be delayed as long as possible. Attempts are often made to achieve this by using additional fire protection panels above the battery modules, which are typically arranged in the under-body area of the motor vehicle, but which are very expensive and very heavy.

Furthermore, DE 10 2011 079 037 A1 describes a battery cell module which comprises a plurality of battery cells, each of which has a degassing opening, and also a gas-receiving chamber assigned to a plurality of battery cells for at least temporarily receiving gas escaping from the battery cells. The volume of the gas-receiving chamber is directly connected to the degassing openings. In order to discharge the gas received in the gas-receiving chamber, the gas-receiving chamber also has an outlet opening. A hose can be connected to this, for example, in order to transport the escaping gas away from the battery cell module. In the event of excess pressure in the battery cell, its degassing opening opens so that gas from the battery cell enters the gas-receiving chamber. The outlet opening in the gas-receiving chamber can also have a check valve which allows a gas flow out of the gas-receiving chamber and prevents a gas flow in the opposite direction.

The gases flowing out of several battery cells are routed into a common gas-receiving chamber, which has the advantage that no separate gas discharge is required for each battery cell. Since there are typically between 200 and 400 battery cells in a high-voltage battery, this represents an enormous simplification of such a gas discharge system. The disadvantage here, however, is that several battery cells are connected to the same gas-receiving chamber, and there is correspondingly increased thermal coupling of the battery cells via this gas-receiving chamber. For example, if gas flows into the gas-receiving chamber from a battery cell with thermal runaway, it also comes into contact with the degassing openings of the other battery cells connected to the degassing chamber, even if these battery cells are still intact and not outgassing. This can lead to greater heating of the still intact battery cells and, in the worst case, also to thermal runaway of these battery cells, or it can accelerate the thermal runaway of these battery cells over time.

SUMMARY

The object of the present invention is thus to provide a degassing channel for a battery, a battery, and a motor vehicle, which enable gases escaping from a battery cell to be discharged as safely and simply as possible in the event of thermal runaway.

In this case, a degassing channel according to the invention for a battery of a motor vehicle is designed to be arranged on a battery module of the battery, which battery module comprises at least one battery with an at least releasable degassing opening, the degassing channel having an opening region through which, in the event that the degassing channel is arranged on the battery module, gas escaping from the degassing opening can at least partially be introduced into an interior of the degassing channel. Furthermore, the opening region has a shielding element which is designed to at least largely prevent a gas flowing through the degassing channel via the opening region from escaping from the degassing channel through the opening region.

The invention is based on the following findings. Often several battery cells of a battery module are connected to a common gas-receiving chamber, which can also be the case for the present degassing channel according to the invention. In the initial state, the interior of a respective first battery cell is often only separated from this gas-receiving chamber by a bursting membrane which closes the degassing opening in the cell housing of a respective battery cell. If a thermal event occurs in a battery cell and gas flows from the interior of this battery cell into such a gas-receiving chamber, this gas flowing through the gas-receiving chamber often also sweeps over the coupling points of other, still intact battery cells, i.e. the bursting membranes thereof. Due to the extremely high temperatures of such gases escaping from a battery cell, the bursting membranes of other, still intact battery cells are destroyed, and such gases can penetrate into the cell interior of still intact battery cells and, above all, lead to thermal coupling with such still intact battery cells, which will accelerate the thermal runaway of these initially still intact battery cells. This triggers a chain reaction that can drastically worsen the extent of thermal runaway of what was initially just a single battery cell. By contrast, the shielding element according to the invention, which is provided through the opening region in the degassing channel, advantageously makes it possible to protect other, still intact battery cells from the gas escaping from battery cells with thermal runaway. The thermal decoupling between the battery cells can be improved enormously as a result, and a chain reaction can be delayed significantly longer. As a result, the safety in the battery system can be increased significantly overall.

To name a few examples beforehand, the shielding element can be designed, for example, in the form of a flap or the like, which only releases the opening region in the degassing channel for a particular battery cell when gas is escaping from this battery cell. As long as this is not the case, the opening region can be at least partially covered by the shielding element, whereby an additional protective function is provided for still intact battery cells that are currently not degassing, and the escape of gases flowing through the degassing channel, through the opening region, which is assigned to another, still intact battery cell, is thereby made extremely difficult or even completely prevented.

In addition, such a shielding element can also prevent gas particles from escaping again from the degassing channel through an opening region and, for example, from reaching an intermediate region between the degassing channel and a particular battery cell. This is where the cell connectors and cell contacts are usually located, which means that the entry of particles into this area could lead to a short-circuit or voltage breakdown or the like. This, too, can now advantageously be prevented by the shielding element without necessarily having to undertake additional sealing measures to seal the area between a particular battery cell and the degassing channel. As a result, the safety can be additionally increased in a particularly simple manner.

The battery, in which the degassing channel according to the invention or one of its embodiments is preferably to be used, is preferably designed as a high-voltage battery, and can also have a plurality of battery modules each with at least one battery cell, preferably a plurality of battery cells each. The battery cells in this case can be formed, for example, as lithium-ion cells. Furthermore, the battery cells can be designed as prismatic battery cells or round cells or pouch cells. Furthermore, an at least releasable degassing opening of a battery cell should be understood to mean a degassing opening which is either closed in the initial state and is released under certain conditions, for example when there is overpressure or a certain temperature is exceeded, or it can also be a permanently released degassing opening. However, it is preferred that the degassing opening is a releasable degassing opening which is closed in the initial state, for example by a bursting membrane. This provides additional protection for the battery cell against the ingress of, for example, moisture or dust or the like.

The degassing channel is also preferably designed for coupling to a plurality of battery cells, for example, of the same battery module or different battery modules. Correspondingly, the degassing channel can also have a plurality of opening regions which are each assigned to a corresponding degassing opening of a respective battery cell. Such an opening region can also be designed with a permanent opening or be closed in the initial state, so that such an opening is only released or opened when the particular battery cell is degassing. Accordingly, the opening region denotes an area of the degassing channel in which an opening is present at least when the battery cell in question is degassing, wherein such an opening can also only result in the event of degassing. Furthermore, the degassing channel is preferably elongated, with a length of the degassing channel being greater than a width and a height of the degassing channel. Its direction of longitudinal extension, furthermore, defines a direction of flow in which gases flow which are entering the degassing channel from battery cells. Its width is preferably smaller than a width of a battery cell viewed in the same direction. Several of such degassing channels, which extend over the respective rows of cells, can be provided for several rows of cells arranged next to one another within a battery. Such a degassing channel is thus much more spatially limited than, for example, a gas-receiving chamber that extends over a large part of the entire battery or even over the entire battery. As a result, the thermal decoupling can in turn be increased, the safety increased, and, in addition, a defined flow direction can be provided without excessive turbulence that impedes a rapid and unimpeded discharge of gas.

Consequently, the degassing channel is thus preferably elongated. This means that the degassing channel has a length in a direction of longitudinal extension which is greater than a height and a width of the degassing channel. Furthermore, the preferably several opening regions lie next to one another along the direction of longitudinal extension of the degassing channel. The degassing channel can be arranged on a battery module, for example, in such a way that it covers the respective degassing openings of the plurality of battery cells, which are preferably also arranged along a line. Furthermore, as already described, it is preferred that the degassing channel has a smaller width than the width of the battery module on which it is arranged. Such an elongated channel has the great advantage, especially in contrast to a large-area degassing chamber, that it enables the gases escaping from the battery cells to be guided in a much more targeted manner, which is why the degassing channel can also be referred to as a guide channel, in which these gases can additionally be guided out of the battery on a locally very limited path. In addition to the advantages already described above, there is also the fact that accordingly, for example, only a small area can be designed as very temperature-resistant, which can be limited to the degassing channel. Other areas, for example the battery housing or a battery cover, accordingly do not have to be particularly temperature-resistant and robust, which represents savings in costs, materials, and weight. Accordingly, it is preferred that at least the degassing channel is formed from a material which can withstand high temperatures at least temporarily. The degassing channel including the shielding element can preferably be formed from metal and/or ceramic and/or carbon. A particularly suitable metal is steel. Due to the shape of the channel, that is to say the elongated design of the degassing channel, it is also possible to direct the gas in any desired geometric direction and to transport it away, depending on the course of the degassing channel. The gas flow or the degassing path can thus advantageously be designed geometrically depending on the requirements in the vehicle.

In a further very advantageous embodiment of the invention, the degassing channel has a first channel wall, which is designed for arrangement on the battery module, and in which the at least one opening region is arranged, the first channel wall having a base element different from the at least one opening region, and in which the shielding element has a first element end and a second element end opposite the first element end and is designed such that, at least in the event that the degassing channel is arranged on the battery module and gas from the at least one battery cell enters the degassing channel through the opening region, the first element end is arranged on the base element and the second element end is spaced apart from the base element and protrudes into the interior of the degassing channel. In other words, the shielding element is designed in such a way that it is raised above the base element, at least in the event of degassing. The base element of the degassing channel can, for example, rest against an upper side of the battery module and be provided, for example, as flat sheet metal. It is particularly preferred that the first element end is arranged on the base element in such a way that it is positioned in front of an opening arranged in the opening region, as viewed in the direction of flow of a gas flowing through the degassing channel. As a result, this opening arranged in the opening region is protected by the shielding element, which thus forms a kind of shield in front of the opening arranged in the opening region. Gases flowing along the degassing channel accordingly impact this shield and are accordingly deflected laterally by this shield, whereby the opening located in the opening region is, so to speak, in the slipstream of the shield and is thus protected from the flowing gases.

As already mentioned at the beginning, it is possible for the shielding element to be designed, for example, in the form of a flap that flips up, which only opens when the battery cell in question is degassing. In this case, the shielding element in its starting position, that is to say the assigned battery cell is not degassing, would also not protrude into the interior of the degassing channel. Nevertheless, it can also be provided that the shielding element is not designed to be movable and is thus rigid and also protrudes into the interior of the degassing channel in its starting position. These two very advantageous embodiments will be explained in more detail later.

According to a further advantageous embodiment of the invention, the degassing channel has a longitudinal extension in a first direction, the shielding element being geometrically designed such that a gas flowing into the interior of the degassing channel through the opening region can be guided in its flow direction in the first direction by means of the shielding element.

In other words, the gas flowing into the interior of the degassing channel through the opening region can be deflected in a specific direction or deflected in its exit direction due to the geometric shape of the shielding element. For example, the shielding element can extend laterally upwards from the first element end to the second element end, in particular with an inclination in the first direction, so that gas entering the degassing channel from the opening region is correspondingly deflected via such an inclination. The shielding element does not necessarily have to be designed with a constant slope or inclination, but can also be designed in a curved manner, for example arcuate or hood-shaped.

This shows the great advantage of the elongated design of the degassing channel in contrast to a gas-receiving chamber or the like, since the formation of a directed flow is only possible in such an elongated degassing channel, whereby a specific flow direction can also be defined. In this way, the contaminant measures described can be implemented particularly effectively in the form of the at least one shielding element, since its geometry and arrangement can be designed to be optimized for the defined flow direction. In the case of diffuse flows with possibly locally changing flow directions, as would be the case with a flat gas-receiving chamber, the contaminant measures provided by such a shielding element would be significantly less effective, at least in the variant with an opening permanently provided in the opening region.

In an already mentioned and further advantageous embodiment of the invention, it is provided that the shielding element is arranged rigidly opposite the base element and, in particular, the second element end protrudes permanently into the interior of the degassing channel opposite the base element. In this example, the opening region can have, for example, a permanent opening in the form of a hole in a channel wall of the degassing channel, in which the shielding element can then be arranged, for example, in the shape of a hemisphere or clamshell at the edge of this opening. As described, it is preferred here that the shielding element is then arranged in the region of the opening in such a way that the first element end, as viewed in the flow direction, is arranged in front of this opening. Correspondingly, the shielding element is also inclined in the flow direction, preferably with a curvature, whereby the flow resistance of the shielding element can be reduced. This is particularly advantageous, since eddy currents can thereby be largely avoided, and backwater and, above all, particle deposition can be prevented, which could otherwise lead to a reduction in the flow cross-section. As a result of such a design and arrangement of the shielding element, the opening located in the opening region is situated in the slipstream of the shielding element and is thereby protected particularly efficiently from the hot gas flow by the shielding element.

In a particularly advantageous alternative embodiment of the invention, it is provided that the shielding element is arranged movably with respect to the base element by the application of force, and it is designed to release an opening in the opening region by means of movement, which opening is closed by the shielding element in a starting position, in particular in which the degassing channel is designed in such a way that, in the event it is arranged on the battery module and gas is escaping the degassing opening of the at least one battery cell, the escaping gas moves the shielding element from its starting position in such a way that the second element end is moved into the interior of the degassing channel. For one thing, the protective effect of the shielding element can hereby be maximized and the flow properties of the degassing channel can be optimized. In the starting position, the shielding element thus closes the opening in the opening region and only releases it when the battery cell assigned to the opening region is degassing by moving the shielding element upwards into the interior of the degassing channel, for example by opening it, similar to a flap or trapdoor. The shielding element can therefore be designed, for example, in the form of a burst opening element which is actively formed when the assigned cell is degassing and which diverts the escaping gas, in particular into the interior of the degassing channel. If, for example, the shielding element is still in its starting position and thus closes the opening that can be released in the opening region because the battery cell assigned to the opening region is currently not degassing and, for example, is still intact, while the opening of another opening region is released, because the other battery cell, which is assigned to this opening region, is degassing and has thermal runaway, the still intact battery cell can be optimally protected particularly efficiently against this gas flow moving through the degassing channel. At the same time, the flow cross-section is not reduced at the point where the shielding element is still closed, which means that the gas from other battery cells can flow unimpeded through the degassing channel.

In an advantageous refinement of the invention, it is provided that the shielding element in its starting position is at least partially separated from the base element by at least one cut, in particular in the form of a perforation or a continuous separating cut. Such a separating cut or a perforation can therefore advantageously provide a predetermined breaking point along the contour of the shielding element, in this example the breaking point being provided by at least one complete cut and/or perforation of the wall of the degassing channel. Such a predetermined breaking point should be provided, above all, along the contour of the shielding element in an area different from the first element end, since the first element end should not be separated from the base element, but should also remain attached to the base element when the assigned battery cell is outgassing. In contrast, the other, second element end of the shielding element should simply be able to fold up in the event of degassing of the assigned battery cell, which can be achieved by such a predetermined breaking point along the contour of the shielding element in the form of a perforation or a continuous separating cut. The shielding element can be formed, for example, from a thin sheet of metal that can be easily bent upward into the interior of the degassing channel by the application of force caused by the degassing flow from the battery cell. In other words, the degassing channel, at least its underside, can be provided simply by flat sheet metal with an incised tab, which is provided by the shielding element.

In a further advantageous embodiment of the invention, the shielding element in its starting position is completely connected to the base element, a contour of the shielding element delimiting the shielding element from the base element having a material weakening at least in some areas. This material weakening should be provided in particular by a reduced wall thickness of the degassing channel in the area of the contour of the shielding element, in particular again in an area different from the first element end, but not in the form of a cut or a perforation as described above in this example. In other words, the channel wall of the degassing channel, in this case, should not have a complete cut and/or perforation and/or separation. For example, the contour of the shielding element can be slotted and/or embossed and/or pre-punched, at least in some areas, but not slit or cut or perforated or the like all the way through. Such a material weakening can be provided in a simple manner, for example, by laser machining of the channel wall of the degassing channel. The contour is thus pre-cut or pre-stamped in an area different from the first element end, but not cut all the way through. This has the great advantage that the shielding element in its starting position completely closes the releasable opening provided in the opening region, and there are also no perforation holes or the like. As a result, no gas flowing through the degassing channel can escape, not even through the smallest openings, as would be the case in the event of a perforation. The protective effect provided by the shielding element can thereby be increased further.

In a further, very advantageous embodiment of the invention, the degassing channel has a second channel wall opposite the first channel wall, the degassing channel being designed in such a way that, if it is arranged on the battery module and gas is escaping from the degassing opening of the at least one battery cell, the escaping gas moves the shielding element out of its starting position in such a way that the second element end is moved into the interior of the degassing channel up to the second channel wall, and the shielding element is reshaped, in particular curved.

As a result, it can advantageously be realized that the shielding element that opens up is supported on an overlying surface of the degassing channel, which surface is provided by the second channel wall and can be reshaped. This prevents the shielding element from folding backwards, that is to say against the defined flow direction. In addition, it can thereby be achieved that the shielding element bends and curves in the process, as a result of which its flow properties are improved. In this way, the shielding element can automatically be shaped in a flow-optimized manner.

In order to make this possible, it is also advantageous if the shielding element in its starting position has a length, that is to say a distance between the first and second element ends, which is greater than the wall distance between the first and second channel walls. Furthermore, the shielding element is designed as thin-walled as possible, for example with a wall thickness in the range of 0.5 mm or generally up to a maximum of 1 mm. As a result, the shielding element can deform or bend particularly easily under the force of the gas flow of the gas escaping from the assigned battery cell.

The degassing channel can, for example, be designed in two or more parts and comprise, for example, a lower shell and an upper shell, which can be separated from one another. The lower shell can, for example, comprise the first channel wall and be provided for arrangement on the battery module, while the upper shell can, for example, comprise the second channel wall and can be placed on the upper shell and connected thereto. The lower shell can then accordingly comprise the respective opening regions with the shielding elements. The degassing channel can thus consist of two shells, the at least one shielding element generally being cut or cut out in one of the two shells, in particular along its contour different from the first element end. Alternatively, the degassing channel can also be designed as a one-piece tube which comprises the relevant shielding elements.

Furthermore, the invention also relates to a battery with a degassing channel according to the invention or one of its embodiments. The advantages described for the degassing channel according to the invention and its embodiments apply, in the same way, to the battery according to the invention. The battery in this case is preferably a battery for a motor vehicle, especially preferably a high-voltage battery. Furthermore, the battery has the at least one battery module with the at least one battery cell with the degassing opening, the degassing channel preferably being arranged on the at least one battery module in such a way that the opening region of the degassing channel is arranged to overlap with the degassing opening of the at least one battery cell. The battery can in particular be designed as already defined above.

Furthermore, the invention also relates to a motor vehicle having a battery according to the invention or one of its embodiments.

The motor vehicle according to the invention is preferably designed as an automobile, in particular as a passenger car or truck, or as a passenger bus or motorcycle. Furthermore, the motor vehicle according to the invention is preferably designed as an electric and/or hybrid vehicle.

The invention also comprises combinations of the features of the described embodiments. The invention therefore also includes implementations which each have a combination of the features of several of the described embodiments, unless the embodiments have been described as mutually exclusive.

BRIEF DESCRIPTION OF THE FIGURES

Exemplary embodiments of the invention are described hereinafter. The figures show the following.

DETAILED DESCRIPTION

The exemplary embodiments explained hereinafter are preferred embodiments of the invention. In the exemplary embodiments, the described components of the embodiments each represent individual features of the invention to be considered independently of one another, each of which also refine the invention independently of one another. Therefore, the disclosure is intended to include combinations of the features of the embodiments other than those shown. Furthermore, the described embodiments can also be supplemented by further previously described features of the invention.

In the figures, the same reference signs designate elements that have the same function.

Figure 1:
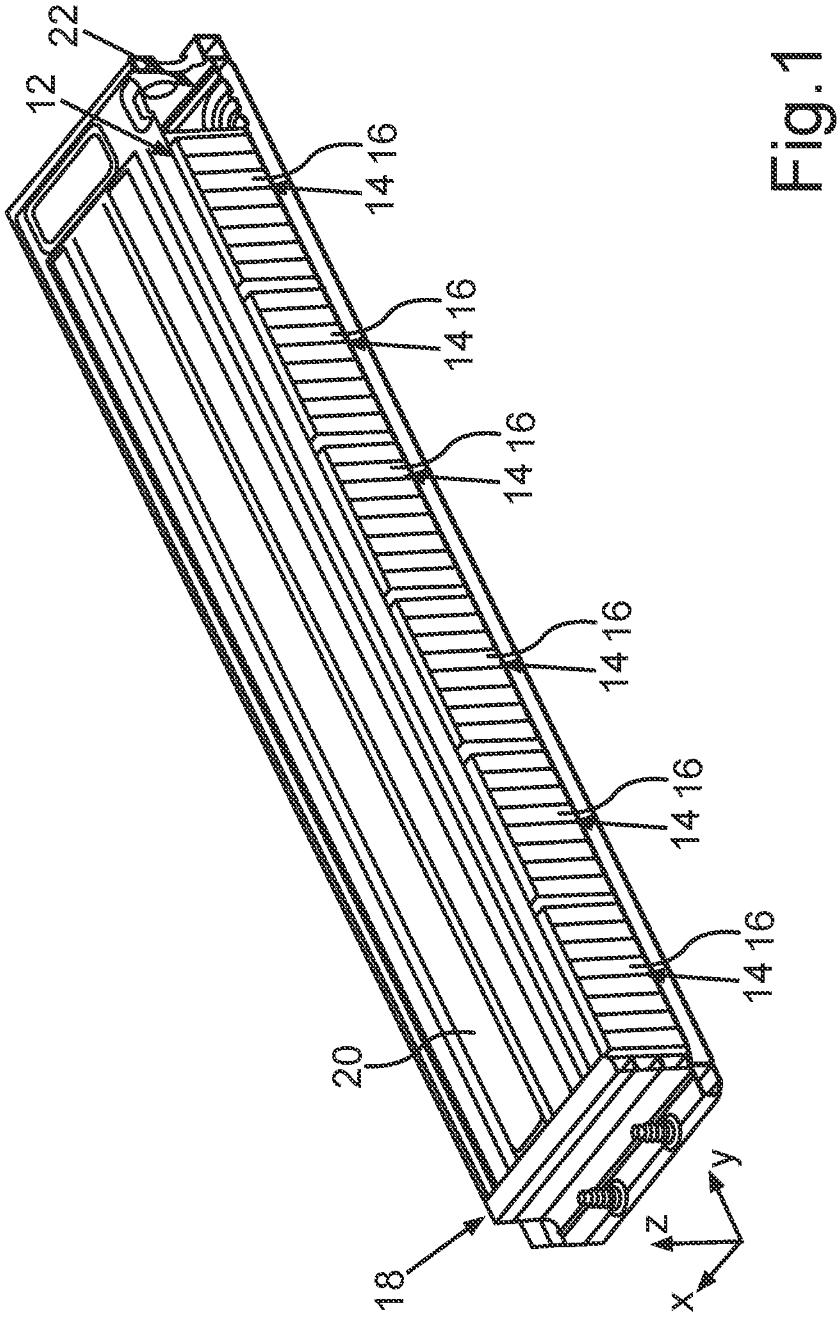
FIG. 1 a perspective illustration of a section through a high-voltage battery for a motor vehicle with a degassing channel according to an exemplary embodiment of the invention.

FIG. 1 shows a schematic and perspective sectional illustration of a battery 10 with a degassing channel 12 according to an exemplary embodiment of the invention. The battery 10 is designed as a high-voltage battery 10 and has a plurality of battery modules 14, each with a plurality of battery cells 16, for example lithium-ion cells. For the sake of clarity, only the battery modules 14 shown in cross-section are provided with a reference number, and in addition only one respectively individual battery cell 16 of a battery module 14 is provided with a reference number. The battery cells 16 in this case are arranged in a row as relates to each other, which row corresponds to a longitudinal extension direction of the degassing channel 12 extending in the y-direction shown here. Furthermore, the battery modules 14 are arranged in a battery housing 18 which has a housing cover 20. The degassing channel 12 extends over all battery cells 16 of the battery modules 14, which are arranged in a row in the y-direction. Furthermore, a plurality of such module rows can be arranged next to one another in the x-direction, it being possible for such a respective degassing channel 12 to be provided for such a respective module row composed of a plurality of battery modules 14.

In the event of thermal runaway of a battery cell, hot gases usually develop that have to be discharged from the battery cell. The described degassing channel 12 can advantageously be used for this purpose. The gases escaping from the respective battery cells 12 can be introduced into these channels and be discharged thereby, in particular from the battery 10 and in particular also from the motor vehicle in which this battery 10 is used. For discharge, the described degassing channels 12 can, for example, first be fed to a collecting channel 22, and this collecting channel 22 can correspondingly have an outlet opening from which the gases can exit from the battery 10. However, each degassing channel 12 can also be routed out of the battery 10 by itself.

Figure 2:
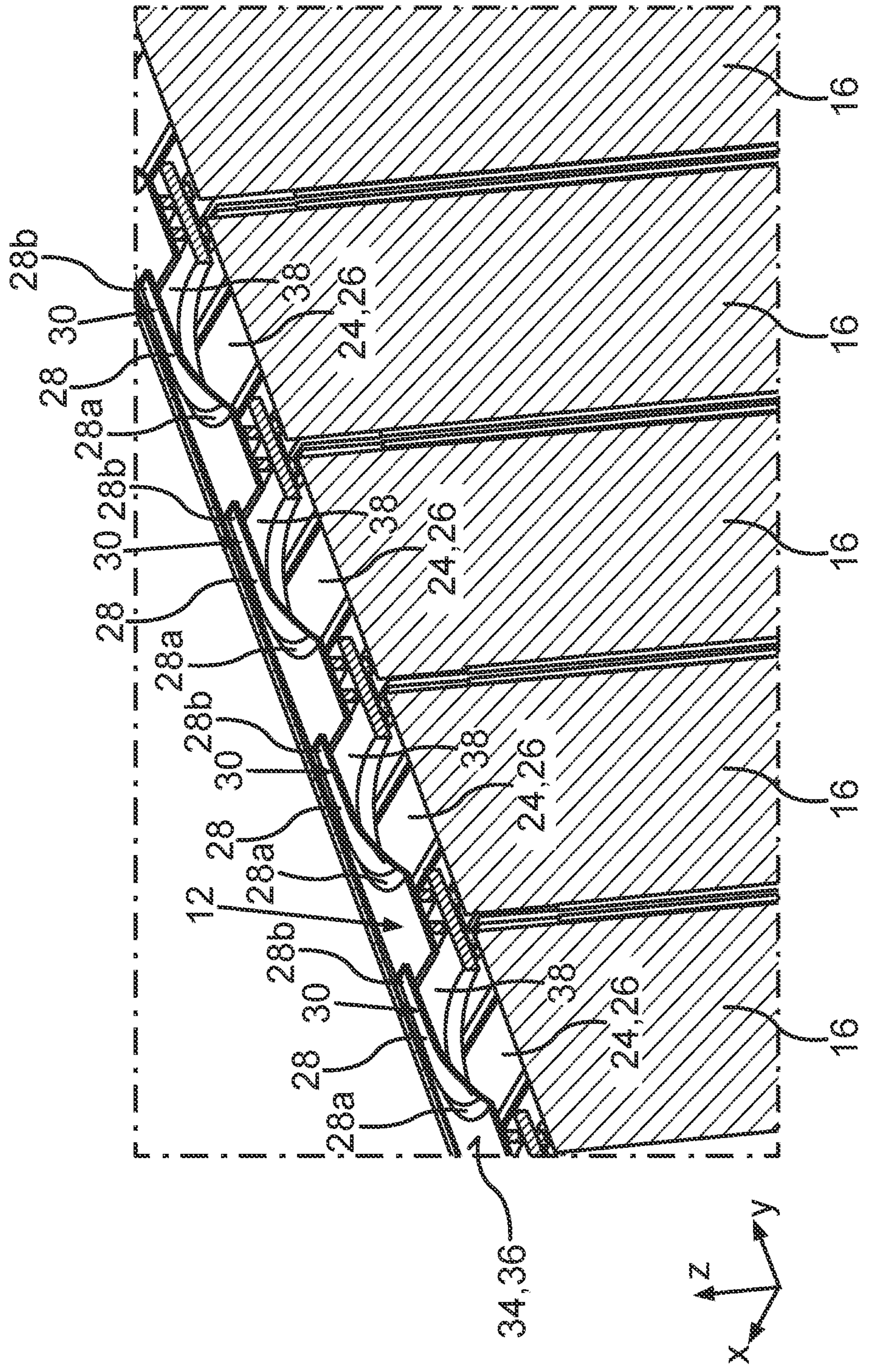
FIG. 2 a detailed perspective view of the section through the battery according to FIG. 1 in the area of the degassing channel according to the exemplary embodiment of the invention.
Figure 5:
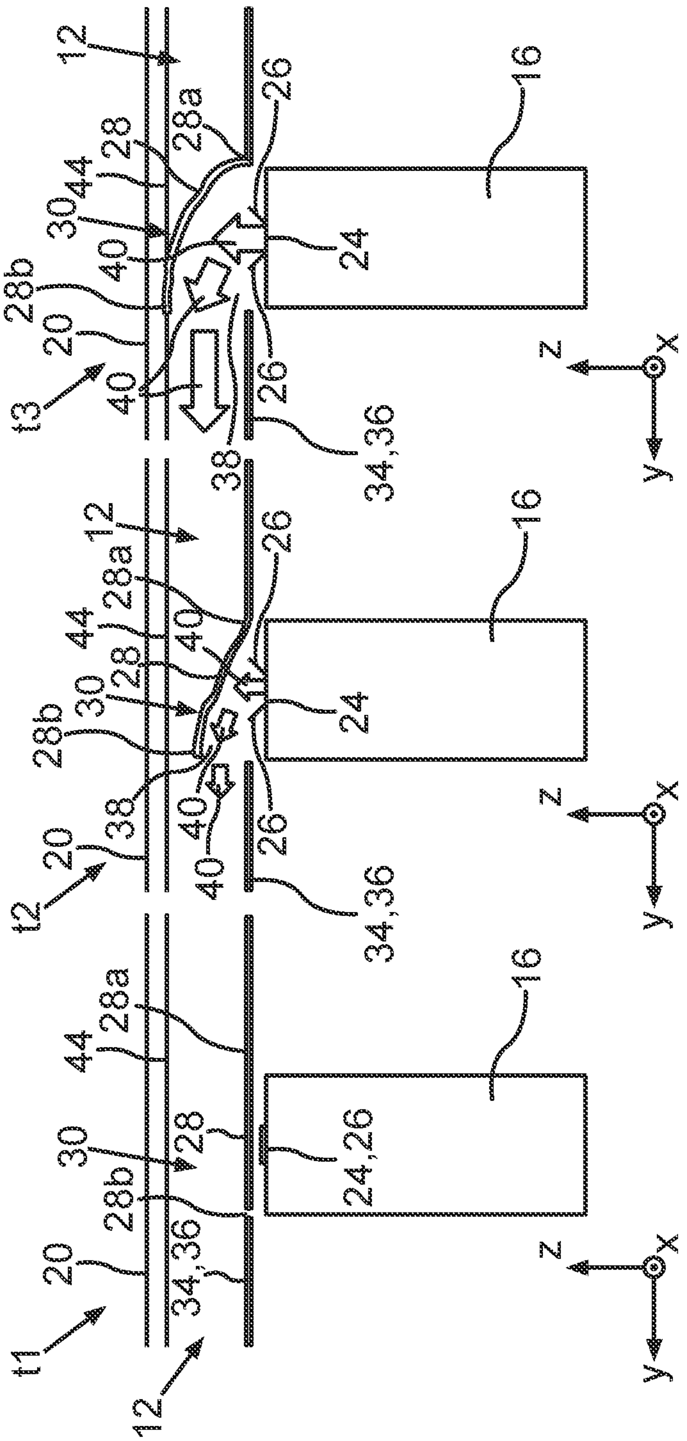
FIG. 5 a schematic cross-sectional illustration of a battery module with a degassing channel arranged on the battery module according to a further exemplary embodiment of the invention.

So that gases can escape from the respective battery cells 16 in a controlled manner, the respective battery cells 16 typically have degassing openings 24 (cf. FIG. 2 and FIG. 5) which are closed in the initial state, for example as shown here by a bursting membrane 26 (cf. FIG. 2 and FIG. 5). Such a bursting membrane 26 can be designed to rupture starting from a certain overpressure inside a battery cell 16 and thereby release the opening, i.e. the degassing opening 24.

As can be seen in FIG. 1, the degassing channel 12 is elongated, which advantageously enables the gases exiting from the battery cells 16 to be discharged and directed, in a targeted manner, in the form of a gas flow in a flow direction that corresponds to the y-direction shown here. Depending on the geometry and guidance direction of such a gas channel 12, the gas flow can thus be directed in any direction, depending on the requirements in the vehicle. The gas exiting from a battery cell 16, which is guided accordingly in the flow direction y along the degassing channel 12, thus also sweeps over the coupling points of other battery cells 16 to which these battery cells 16 with the degassing channel 12 are coupled.

In conventional batteries, this has the major disadvantage that this hot gas sweeps over the area of the aforementioned burst openings of the other battery cells, especially battery cells that are still intact, and may destroy their sensitive bursting membrane and in some cases penetrate into battery cells that are still intact. In addition, this creates thermal coupling and enormous heating of battery cells that are still intact due to this hot gas from other battery cells. This in turn has the consequence that battery cells that are still intact heat up very strongly and consequently also have thermal runaway, which results in a chain reaction that develops very quickly. This can now advantageously be prevented or at least delayed by the invention or its embodiments, as will now be explained in more detail below.

In particular, this is achieved in that a respective opening region, via which gas escaping from a battery cell 16 can penetrate into the degassing channel 12, has a shielding element which is designed to prevent a gas flowing through the degassing channel 12 via the opening region from escaping from the degassing channel 12 through the relevant opening region, at least for the most part.

Figure 3:
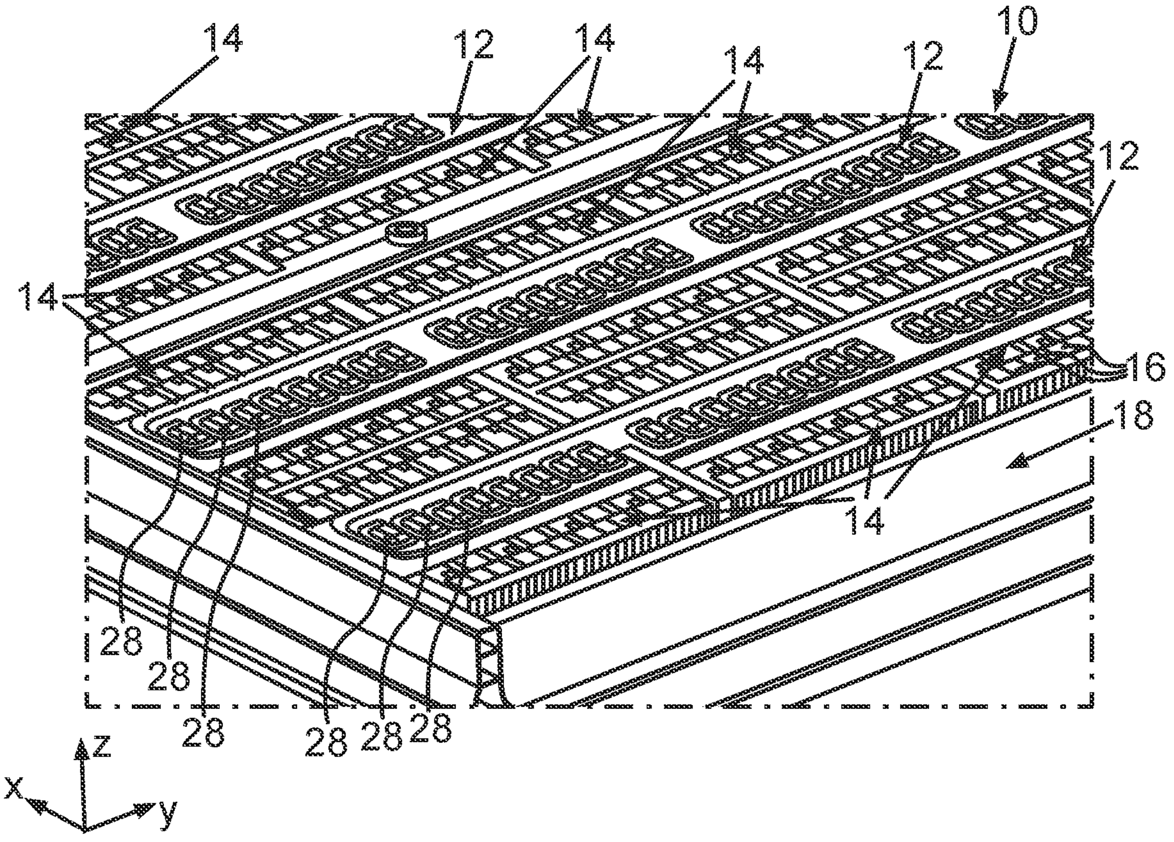
FIG. 3 a schematic and perspective illustration of the battery from FIG. 1 and FIG. 2 without a housing cover according to an exemplary embodiment of the invention.

For this purpose, FIG. 2 shows a first example of a possible design of such shielding elements 28 of the degassing channel 12. In particular, FIG. 2 shows a detailed view of a section of the battery 10 from FIG. 1 in the area of the degassing channel 12. FIG. 3 further shows a schematic and perspective view of the battery 10 from FIG. 1, but without the housing cover, so that the battery modules 14 arranged in several rows in the y-direction with degassing channels 12 arranged on the respective module rows can be clearly seen here. For a respective battery cell 16, the degassing channel 12 has an opening region 30 which is assigned to a respective degassing opening 24 of the assigned battery cell 16, in particular such that the gas from the battery cell 16 escaping from the assigned degassing opening 24 can penetrate through the assigned opening region 30 into an interior 32 of the degassing channel 12.

Each opening region 30 comprises a shielding element 28 which is designed such that gas flowing over the opening region 30 is prevented from escaping from the degassing channel 12. In the present example, this is achieved by a permanently raised shielding element 28, i.e. this shielding element 28 is raised above a base element 34 which is part of a channel wall 36 of the degassing channel 12, which channel wall faces the battery cells 16, in which this base element 34 is different from the opening regions 34. In other words, this base element 34 can define the remaining area of a lower channel wall 36 of the degassing channel 12, which area is different from the opening regions 30. This base element 34 can be designed, for example, as flat sheet metal. Furthermore, the shielding elements 28 have a first element end 28*a*, which is arranged on the base element, and an opposite element end 28*b*, which is spaced apart from the base element 34. The shielding element 28 thus extends upwards from the base element 34, as viewed in the y-direction shown here, and is curved in the process. This is advantageous in terms of flow technology. In addition, the opening 38 is hereby located in the opening region 30 in the z-direction, below the shielding element 28, in the slipstream of this shielding element 28 when a gas flow flows through the degassing channel 12 in the y-direction. The opening 38 in the matching area 30 is therefore a permanent opening which also exists when the assigned battery cell 16 is currently not degassing.

In this example, the shielding element 28 is arranged in the shape of a hemisphere or clamshell over the opening 38, as a result of which the opening is protected. At the same time, this geometry of the shielding element 28 enables the gas flow escaping from the assigned battery cell 16 to be directed in the y-direction of the degassing channel 12. This also reduces turbulence, which is particularly advantageous since turbulence could lead to a deposition of gas particles in the degassing channel 12 and to blockage of the latter.

The flow-optimized design of the shielding elements 28 and the gas control provided by the geometry of these shielding elements 28 enable particularly fast and efficient discharge of the hot gas and, at the same time, thermal decoupling of cells with thermal runaway and battery cells that are still intact. As a result, a chain reaction can be delayed significantly longer, whereby protection can be provided for a longer period of time for the occupants of a motor vehicle involved in an accident.

Figure 4:
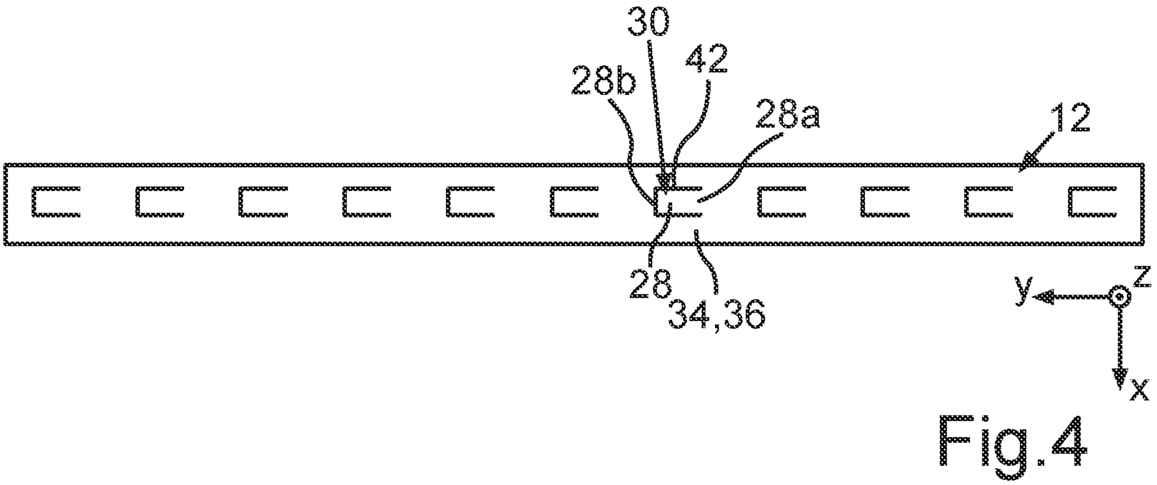
FIG. 4 a schematic illustration of a top view of a degassing channel for a battery module according to a further exemplary embodiment of the invention.

In addition to the possibility of providing this protective effect by means of rigid shielding elements 28, as described above, there is also advantageously the possibility of making such a shielding element 28 movable, for example in the form of a flap, which only releases the opening 38 in the opening region 30 when the assigned battery cell 16 in question is outgassing. This will now be described with reference to FIG. 4 and FIG. 5. FIG. 4 shows a schematic top view of a degassing channel 12 according to a further exemplary embodiment of the invention, and FIG. 5 shows a schematic sectional illustration through a battery module 14 with at least one battery cell 16 and a degassing channel 12 arranged thereon at three successive time steps according to this further exemplary embodiment of the invention. In particular, the battery 10, which comprises this battery module 14 and also the degassing channel 12, and also the degassing channel 12 itself can be designed as described above, with the exception of the differences explained in more detail below. In this case as well, the degassing channel 12 again has a plurality of opening regions 30 arranged in a row in the y-direction, each of which is assigned to a degassing opening 24 of a relevant battery cell 16. In the intact state of a battery cell 16, these degassing openings 24 are closed by a bursting membrane 26, which opens or ruptures if the pressure inside a battery cell 16 becomes too high. As a result, the gas 40 produced in the battery cell 16 can escape from the latter. The escaping gas 40 is shown in particular in the form of arrows in FIG. 5.

FIG. 5 shows in particular the arrangement of a battery cell 16 and the degassing channel 12 at three different, successive time steps t1, t2, t3. At a first time step t1, the battery cell 16 is still in the intact state, and no gas is escaping from the battery cell 16. At a later point in time t2, the battery cell 16 begins to outgas. As a result of the increasing gas pressure inside the battery cell 16, the bursting membrane 26 ruptures and the gas 40 exits from the battery cell 16. The escaping gas acts on the shielding element 28 from below in the z-direction with a force. As a result of this application of force, the shielding element 28 moves upwards somewhat in the z-direction. In particular, the first element end **28*a* remains fixedly arranged on the base element 34. The opposite second element end 28*b* is pushed upwards, i.e. in the z-direction, by the exiting gas flow. In order to enable this movement of the shielding element 28, the contour 42 of the shielding element 28 is formed with a material weakening, except for the first element end 28*a*. This material weakening can be provided in the form of a continuous slot and/or in the form of a perforation. The material weakening can, however, also be designed in such a way that there is no complete breakthrough of the channel wall 36 in the opening region 30 or along the contour 42. For example, this contour 42 can have a reduced wall thickness and, for example, be scored. In any case, such a material weakening advantageously provides a predetermined breaking point, which enables the shielding element 28 to be moved in the z-direction, i.e. out of the plane of the base element 34, in the event of a gas flow 40 escaping from the assigned battery cell 16. The degassing channel 12, in particular the lower structure of the degassing channel 12 or guide channel 12, can thus be provided with pre-cut outlet openings 28 or defined cutouts 28 which fold up when pressure is applied and which accordingly provide the shielding elements 28**.

This has the great advantage that, in the initial state or the starting position of the shielding element 28, which is illustrated at time t1, there is no opening 28 in the opening region 30, but this opening 28 only develops when the shielding element 28 is moved upwards somewhat. This provides even better protection for the particular battery cell 16, which is still intact.

Furthermore, it is advantageous if, during the opening, the shielding element 28 is supported on a second channel wall 44, which is opposite the first channel wall 36, as is illustrated at time t3. The shielding element 28 is thus pushed upwards in the z-direction until its second element end **28*b* comes into contact with this second channel wall 44. Subsequently, the further exiting gas flow 40 and the forces thereby acting on the shielding element 28 deform or bend it. This automatically results in a geometry of the shielding element 28 that is advantageous in terms of flow technology. Furthermore, the escaping gas 40 is also hereby specifically directed in the flow direction, i.e. in the y-direction shown here. Turbulence can in turn be avoided. In this example, the shielding element is provided by a heat-resistant burst opening element which is attached to the relevant battery cell 16 above the degassing opening 24, which is actively formed when the cell 16 is degassing and which discharges the escaping gas 40. A channel 12 is provided above the cells, which opens partially as soon as the hot gas 40 emerges. The housing cover 20 of the battery housing 18 can also be arranged above the degassing channel 12**.

Overall, the examples show how the invention can provide an actively controllable gas control system which, through the provision of a shielding element, enables the hot gas escaping from cells in the event of a defect or accident to be quickly diverted and thereby protects the occupants of the motor vehicle for a longer period of time. In addition, cost and weight savings can be achieved by dispensing with additional measures.

The invention claimed is:

1. A degassing channel for a battery of a motor vehicle, wherein the degassing channel is designed for arrangement on a battery module of the battery, which battery module comprises a plurality of battery cells, each with at least one releasable degassing opening, wherein the degassing channel has an opening region, wherein the degassing channel has a longitudinal extension in a first direction (y), wherein the first direction (y) corresponds to a flow direction of gas flowing through the degassing channel, wherein the opening region includes a plurality of openings, through which, in the event that the degassing channel is arranged on the battery module, gas escaping from one or more of the releasable degassing openings can at least partially be introduced into an interior of the degassing channel, wherein the degassing channel has a first channel wall configured for arrangement on the battery module and a second channel wall opposite the first channel wall, wherein the opening region is arranged in the first channel wall, and wherein the first channel wall includes a base element different from the opening region, wherein the opening region has a respective shielding element over each of the plurality of openings, each of the plurality of openings being assigned to a respective degassing opening of a respective battery cell, wherein each shielding element is hood-shaped and extends over the respective opening, wherein each shielding element has a first element end arranged on the base element and a second element end opposite the first element end, wherein, at least when gas escaping from the respective degassing opening enters the degassing channel through the respective opening, the second element end is spaced apart from the base element and protrudes into the interior of the degassing channel, wherein, as viewed in the first direction (y), the first element end of each shielding element is arranged in front of the respective opening, wherein, as viewed in a direction from the first channel wall toward the second channel wall, each hood-shaped shielding element overlies the respective opening, and wherein each shielding element extends from the first element end toward the second element end with an inclination in the first direction (y) and with a curvature, each shielding element at least largely preventing gas flowing through the degassing channel via the opening region from escaping from the degassing channel through the opening region, wherein, as viewed in the first direction (y), each shielding element is positioned in front of the respective opening such that the respective opening is located downstream of the shielding element in a slipstream of the shielding element, wherein each shielding element is geometrically curved such that gas flowing into the interior of the degassing channel through the respective opening can be guided in the first direction (y) by the shielding element; and wherein each shielding element is configured to guide the gas flowing into the interior of the degassing channel through the respective opening in the same direction as each other shielding element;

wherein each of the shielding elements has a length in a starting position that is greater than a distance between the first channel wall and the second channel wall; and wherein each of the shielding elements has a thickness in a range from 0.5 mm to 1 mm.

2. The degassing channel according to claim 1, wherein each shielding element is arranged rigidly opposite the base element, and wherein the second element end of each shielding element protrudes permanently into the interior of the degassing channel, opposite the base element.

3. A battery for a motor vehicle, with a degassing channel according to claim 1, wherein the battery has at least one battery module with the plurality of battery cells each having a respective degassing opening, wherein the degassing channel is arranged on the at least one battery module such that the plurality of openings of the opening region of the degassing channel are respectively arranged with corresponding degassing openings of the plurality of battery cells.

* * * * *